United States Patent
Narendra et al.

(10) Patent No.: US 11,543,249 B2
(45) Date of Patent: Jan. 3, 2023

(54) METHOD, SYSTEM AND APPARATUS FOR NAVIGATIONAL ASSISTANCE

(71) Applicant: ZEBRA TECHNOLOGIES CORPORATION, Lincolnshire, IL (US)

(72) Inventors: Patrenahalli M. Narendra, Hoffman Estates, IL (US); Joseph R. White, Glenwood, MD (US)

(73) Assignee: Zebra Technologies Corporation, Lincolnshire, IL (US)

( * ) Notice: Subject to any disclaimer, the term of this patent is extended or adjusted under 35 U.S.C. 154(b) by 51 days.

(21) Appl. No.: 17/318,718

(22) Filed: May 12, 2021

(65) Prior Publication Data

US 2021/0262806 A1    Aug. 26, 2021

Related U.S. Application Data

(63) Continuation of application No. 16/217,296, filed on Dec. 12, 2018, now Pat. No. 11,015,938.

(51) Int. Cl.
*H04W 24/00* (2009.01)
*G01C 21/20* (2006.01)
*G01C 21/00* (2006.01)
*G01S 11/08* (2006.01)
*H04B 17/318* (2015.01)

(Continued)

(52) U.S. Cl.
CPC ......... *G01C 21/206* (2013.01); *G01C 21/005* (2013.01); *G01S 11/06* (2013.01); *G01S 11/08* (2013.01); *H04B 17/318* (2015.01); *H04W 64/003* (2013.01)

(58) Field of Classification Search
CPC .......... G01S 17/06; G01S 5/163; G01S 17/48; G01S 2013/466; G01S 2013/468; G01S 7/481; G05D 1/0234; G05D 1/0061; G05D 1/0212; G05D 1/0223; G05D 1/0231; G05D 1/0272; G05D 1/0274; G05D 1/028; G05D 2201/0203; G05D 2201/0207; G05D 2201/0213; H04N 7/18; H04N 7/188
USPC .......... 455/456.3, 456.1, 457, 562.1
See application file for complete search history.

(56) References Cited

U.S. PATENT DOCUMENTS 9,064,394 B1 * 6/2015 Trundle ............... G08B 13/08
2005/0213082 A1 * 9/2005 DiBernardo ........... G01S 5/163
                                                           356/139.03

(Continued)

*Primary Examiner* — Joseph Arevalo

(57) ABSTRACT

An assistive navigational system for deployment in a facility having a global frame of reference includes: a server including a memory storing: a plurality of anchor definitions each containing (i) an anchor position in the global frame of reference, and (ii) a feature set corresponding to physical characteristics of the facility at the anchor position; and a task definition containing (i) a task position defined relative to the anchor position, and (ii) task overlay data; the server further including a communications interface, and a processor configured to: select one of the anchor definitions for association with the task definition; and transmit the selected anchor definition and the task definition to a mobile computing device, the mobile computing device configured to receive the selected anchor definition and the task definition; the mobile computing device further configured to present the task overlay data on a display.

16 Claims, 10 Drawing Sheets

(51) Int. Cl.
*G01S 11/06* (2006.01)
*H04W 64/00* (2009.01)

(56) References Cited

U.S. PATENT DOCUMENTS

| | | | |
|---|---|---|---|
| 2005/0213109 A1* | 9/2005 | Schell | G01S 17/06 |
| | | | 356/614 |
| 2013/0030700 A1* | 1/2013 | Miller | G08G 1/20 |
| | | | 701/500 |
| 2013/0138246 A1* | 5/2013 | Gutmann | G01C 21/12 |
| | | | 901/1 |
| 2014/0156133 A1* | 6/2014 | Cullinane | B60K 37/06 |
| | | | 701/23 |
| 2016/0132815 A1* | 5/2016 | Itoko | G06Q 50/01 |
| | | | 705/7.42 |
| 2017/0011308 A1* | 1/2017 | Sun | G06F 11/00 |

* cited by examiner

METHOD, SYSTEM AND APPARATUS FOR NAVIGATIONAL ASSISTANCE

CROSS-REFERENCE TO RELATED APPLICATIONS

This application is a continuation of U.S. patent application Ser. No. 16/217,296, filed Dec. 12, 2018, entitled "Method, System and Apparatus for Navigational Assistance," which is incorporated herein by reference in its entirety.

BACKGROUND

Environments in which objects are managed, such as retail facilities, may be complex and fluid. For example, a retail facility may include objects such as products for purchase, a distribution environment may include objects such as parcels or pallets, a manufacturing environment may include objects such as components or assemblies, a healthcare environment may include objects such as medications or medical devices.

Tasks may be identified for execution within such environments, for example to correct price labels on products, restock a supply of products, and the like. Such tasks may be assigned to human operators for execution. The presence of a variable number of tasks, as well as a variable number of mobile operators, within the environment at any given time can lead to inefficient allocation of tasks to operators, resulting in underutilization or overutilization of certain operators or the need for expensive training of multiple operators on multiple tasks.

Further, the operator assigned to perform a given task may be required to accurately locate a position within the facility at which the task is to be performed. A mobile computing device carried by the operator may have insufficiently accurate localization to guide the operator to the correct position within the facility, resulting in incorrectly executed tasks, delays in task execution, or both.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
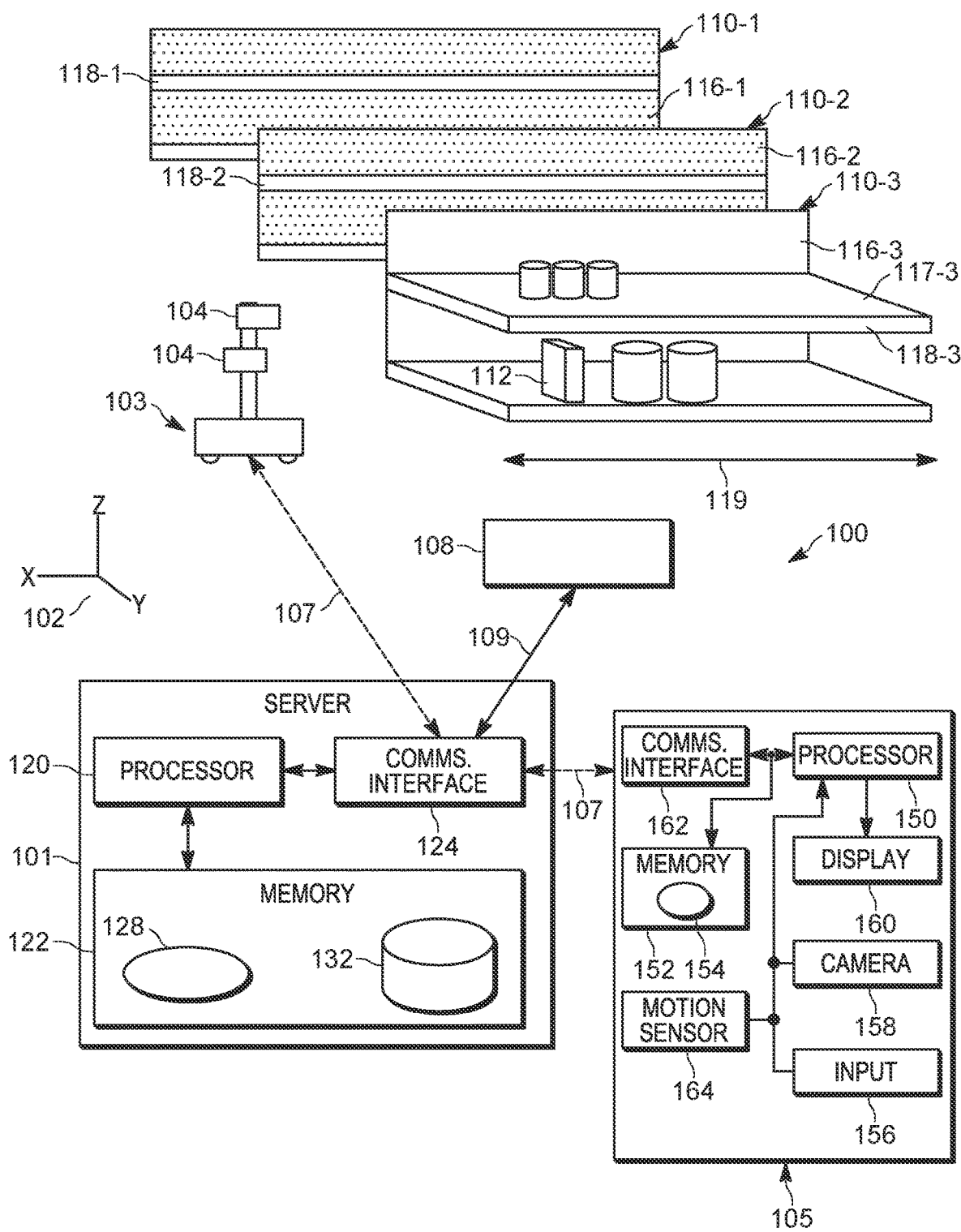
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of navigational assistance at a mobile computing device for deployment in a facility having a global frame of reference, the method comprising: receiving an anchor definition containing (i) an anchor position in the global frame of reference, and (ii) a feature set corresponding to physical characteristics of the facility at the anchor position; receiving a task definition containing (i) a task position defined relative to the anchor position, and (ii) task overlay data; capturing, using an image capture module, a sequence of images; responsive to detecting the feature set in the sequence of images, determining a local device position of the mobile computing device relative to the anchor position; based on the local device position and the task position, determining whether the task position is within a field of view of the mobile computing device; and responsive to determining that the task position is within the field of view, presenting the sequence of images overlaid with the overlay data on a display.

Additional examples disclosed herein are directed to a mobile computing device for navigational assistance in a facility having a global frame of reference, the mobile computing device comprising: a memory storing: an anchor definition containing (i) an anchor position in the global frame of reference, and (ii) a feature set corresponding to physical characteristics of the facility at the anchor position; and a task definition containing (i) a task position defined relative to the anchor position, and (ii) task overlay data; a display; an image capture module configured to capture a sequence of images; a processor connected to the memory, the display and the image capture module, the processor configured to: responsive to detecting the feature set in the sequence of images, determine a local device position of the mobile computing device relative to the anchor position; based on the local device position and the task position, determine whether the task position is within a field of view of the mobile computing device; and responsive to determining that the task position is within the field of view, control the display to present the sequence of images overlaid with the overlay data on a display.

Further examples disclosed herein are directed to an assistive navigational system for deployment in a facility having a global frame of reference, the system comprising: a server including a memory storing: a plurality of anchor definitions each containing (i) an anchor position in the global frame of reference, and (ii) a feature set corresponding to physical characteristics of the facility at the anchor position; and a task definition containing (i) a task position defined relative to the anchor position, and (ii) task overlay data; the server further including a communications interface, and a processor configured to: select one of the anchor definitions for association with the task definition; and transmit the selected anchor definition and the task definition to a mobile computing device, the mobile computing device configured to receive the selected anchor definition and the task definition; the mobile computing device further configured to present the task overlay data on a display.

FIG. 1 depicts a mobile automation and navigational system 100 in accordance with the teachings of this disclosure. The system 100 is illustrated as being deployed in a retail environment, but in other embodiments can be deployed in a variety of other environments, including warehouses, manufacturing facilities, hospitals, and the like. The above-noted environments are referred to herein generically as facilities. The system 100 includes a server 101 in communication with at least one mobile automation apparatus 103 (also referred to herein simply as the apparatus 103) and at least one client computing device 105 (also referred to herein as a mobile computing device 105) via communication links 107, illustrated in the present example as including wireless links. In the present example, the links 107 are provided by a wireless local area network (WLAN) deployed within the retail environment by one or more access points (not shown). In other examples, the server 101, the client device 105, or both, are located outside the retail environment, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 is implemented as another type of mobile computing device, such as a laptop computer, a desktop computer mounted on a mobile cart, a dedicated vehicle computer (as in a forklift), smart glasses, a virtual-reality headset, or the like. The system 100 can include a plurality of client devices 105 in communication with the server 101 via respective links 107.

The system 100 is deployed, in the illustrated example, in a retail facility including a plurality of shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees.

The apparatus 103 is deployed within the retail facility, and communicates with the server 101 (e.g. via the link 107) to navigate, autonomously or partially autonomously, along a length 119 of at least a portion of the shelves 110. The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 can be configured to employ the sensors 104 to both navigate among the shelves 110 (e.g. according to the paths mentioned above) and to capture shelf data during such navigation.

The server 101 includes a special purpose controller, such as a processor 120, specifically designed to control and/or assist the mobile automation apparatus 103 to navigate the environment and to capture data. The processor 120 can be further configured to obtain the captured data via a communications interface 124 for storage in a repository 132 and subsequent processing, e.g. to detect objects such as shelved products in the captured data, and detect status information corresponding to the objects.

The server 101 may also be configured to transmit status notifications (e.g. notifications indicating that products are out-of-stock, low stock or misplaced) to the client device 105 responsive to the determination of product status data. The status notifications, as will be discussed in greater detail below, are provided to the client device 105 in the form of task definitions, indicating what tasks are to be performed (e.g. by a human operator of the client device 105) to correct the status of one or more objects. The server 101 is further configured to provide to the client device 105, along with the above-noted task definitions, navigational information that the client device 105 is configured to process to guide the operator to the appropriate location within the facility for execution of the task (e.g. to correct a price label, relocate is misplaced product, and the like). Navigational information can include positions within the facility defined according to a global frame of reference 102 (e.g. a coordinate system).

The processor 120 is interconnected with a non-transitory computer readable storage medium, such as the above-mentioned memory 122, having stored thereon computer readable instructions for performing various functionality, including control of the apparatus 103 to capture shelf data, post-processing of the shelf data, and generating and providing task and navigational data to the client device 105. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the application 128 or subcomponents thereof and in conjunction with the other components of the server 101, the processor 120 is configured to implement various functionality related to generating or otherwise obtaining task definitions and navigational information for provision to the client device 105 to guide an operator of the client device 105 to the appropriate location within the facility to perform one or more tasks, as noted above. The processor 120, as configured via the execution of the control application 128, is also referred to herein as the controller 120. As will now be apparent, some or all of the functionality implemented by the controller 120 described below may also be performed by preconfigured special purpose hardware controllers (e.g. one or more FPGAs and/or Application-Specific Integrated Circuits (ASICs) configured for navigational computations) rather than by execution of the control application 128 by the processor 120.

The client device 105 includes a special-purpose controller, such as a processor 150, interconnected with a non-transitory computer readable storage medium, such as a memory 152. The memory 152 includes a combination of volatile (e.g. Random Access Memory or RAM) and non-volatile memory (e.g. read only memory or ROM, Electrically Erasable Programmable Read Only Memory or EEPROM, flash memory). The processor 150 and the memory 152 each comprise one or more integrated circuits.

The client device 105 also includes at least one input device 156 interconnected with the processor 150. The input device 156 is configured to receive input and provide data representative of the received input to the processor 150. The input device 156 includes any one of, or a suitable combination of, a touch screen, a keypad, a trigger button, a microphone, and the like. In addition, the client device 105 includes a camera 158 including a suitable image sensor or combination of image sensors. The camera 158 is configured to capture images (e.g. single frames or video streams including sequences of image frames) for provision to the processor 150.

The client device 105 also includes a display 160 (e.g. a flat-panel display integrated with the above-mentioned touch screen) interconnected with the processor 150, and configured to render data under the control of the processor 150. The client device 105 can also include one or more output devices in addition to the display 160, such as a speaker, a notification LED, and the like (not shown).

The client device 105 also includes a communications interface 162 interconnected with the processor 150. The communications interface 162 includes any suitable hardware (e.g. transmitters, receivers, network interface controllers and the like) allowing the client device 105 to communicate with other computing devices via wired and/or wireless links (e.g. over local or wide-area networks). The specific components of the communications interface 162 are selected based on the type(s) of network(s) or other links that the client device 105 is required to communicate over.

Further, the client device 105 includes a motion sensor 164, such as an inertial measurement unit (IMU) including one or more accelerometers, one or more gyroscopes, and/or one or more magnetometers. The motion sensor 164 is configured to generate data indicating detected movement of the client device 105 and provide the data to the processor 150, for example to enable the processor 150 to maintain one or more localizations of the client device 105 (i.e. with respect to the frame of reference 102 or a local frame of reference, as will be discussed in greater detail below).

The memory 152 stores computer readable instructions for execution by the processor 150. In particular, the memory 152 stores a navigational assistance application 154 (also referred to simply as the application 154) which, when executed by the processor 150, configures the processor 150 to perform various functions discussed below in greater detail and related to the receipt and presentation of task and navigational information. The application 150 may also be implemented as a suite of distinct applications in other examples.

The processor 150, when so configured by the execution of the application 154, may also be referred to as a navigational assistance controller 150. Those skilled in the art will appreciate that the functionality implemented by the processor 150 via the execution of the application 154 may also be implemented by one or more specially designed hardware and firmware components, such as FPGAs, ASICs and the like in other embodiments.

Figure 2A:
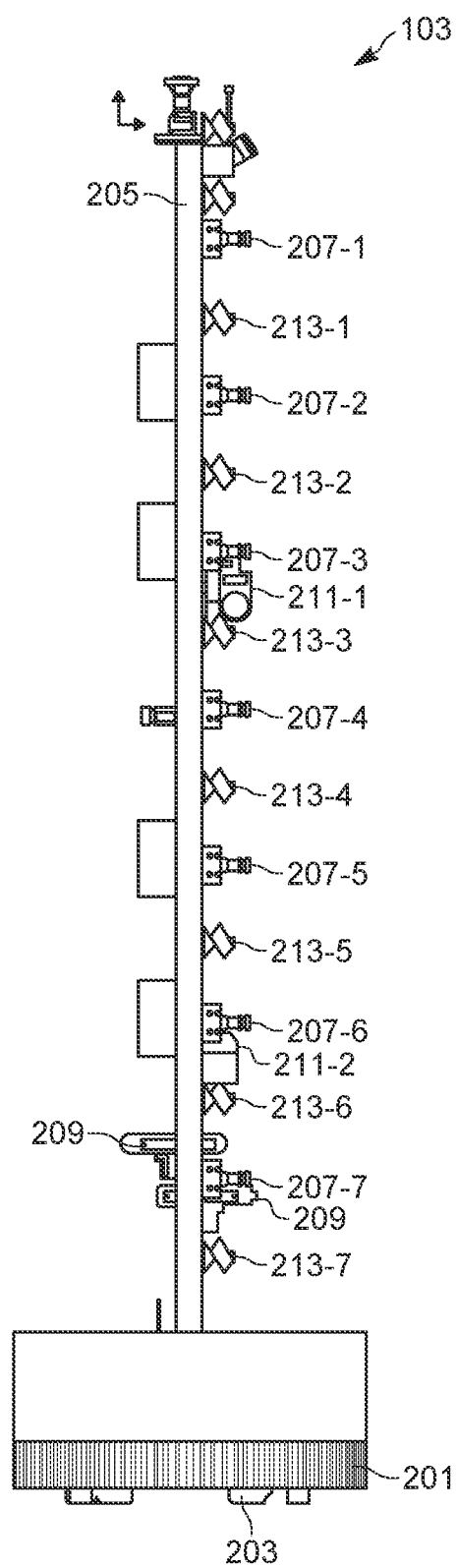
FIG. 2A depicts a mobile automation apparatus in the system of FIG. 1.
Figure 2B:
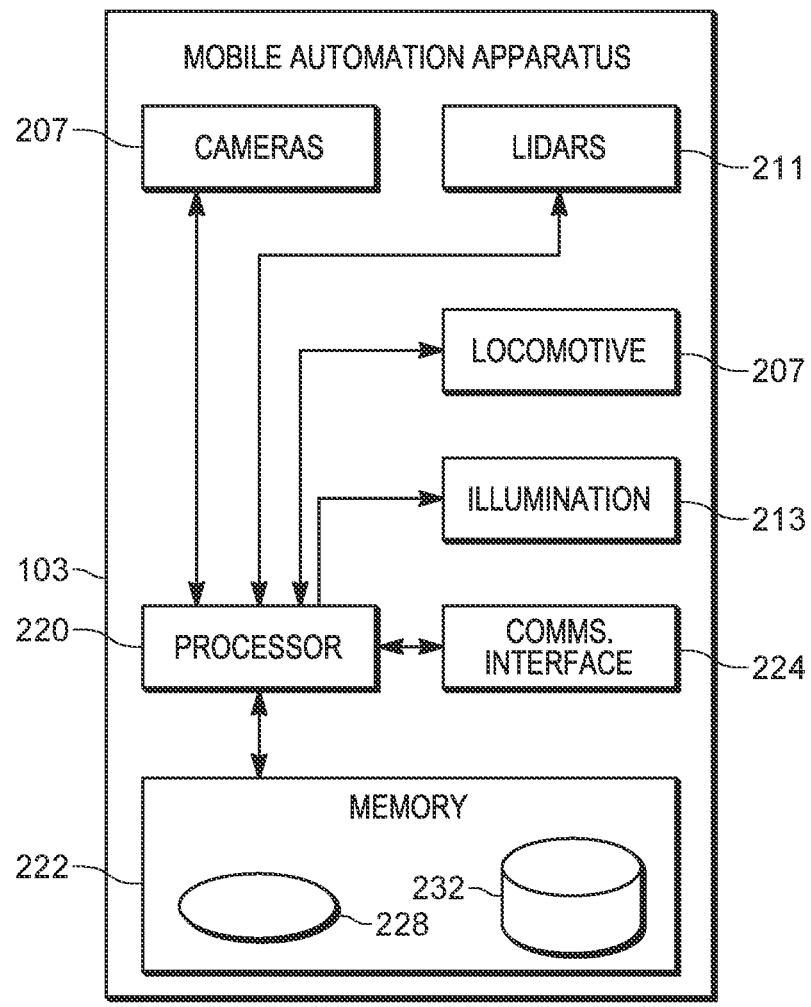
FIG. 2B is a block diagram of certain internal hardware components of the mobile automation apparatus in the system of FIG. 1.

Turning now to FIGS. 2A and 2B, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth sensor 209, such as a 3D digital camera. The apparatus 103 also includes additional depth sensors, such as LIDAR sensors 211. In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is travelling. The apparatus 103 is configured to track a location of the apparatus 103 (e.g. a location of the center of the chassis 201) in the global frame of reference 102 previously established in the retail facility, permitting data captured by the mobile automation apparatus 103 to be registered to the common frame of reference. The above-mentioned location of the apparatus 103 within the frame of reference 102, also referred to as localization, is employed in the generation of paths for execution by the apparatus 103.

The mobile automation apparatus 103 includes a special-purpose navigational controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a navigation application 228 which, when executed by the processor 220, configures the processor 220 to perform various functions discussed below in greater detail and related to the navigation of the apparatus 103 (e.g. by controlling the locomotive mechanism 203). The application 228 may also be implemented as a suite of distinct applications in other examples.

The processor 220, when so configured by the execution of the application 228, may also be referred to as a navigational controller 220. Those skilled in the art will appreciate that the functionality implemented by the processor 220 via the execution of the application 228 may also be implemented by one or more specially designed hardware and firmware components, such as FPGAs, ASICs and the like in other embodiments.

The memory 222 may also store a repository 232 containing, for example, one or more maps of the environment in which the apparatus 103 operates, for use during the execution of the application 228. The apparatus 103 may communicate with the server 101, for example to receive instructions to navigate to specified locations and initiate data capture operations, via a communications interface 224 over the link 107 shown in FIG. 1. The communications interface 224 also enables the apparatus 103 to communicate with the server 101 via the dock 108 and the link 109.

The functionality of the applications 128 and 154 will now be described in greater detail. In particular, the generation of task and navigational information for deployment to the client device 105 from the server 101, as well as the processing of the above-mentioned information at the client device 105, will be described.

Figure 3:
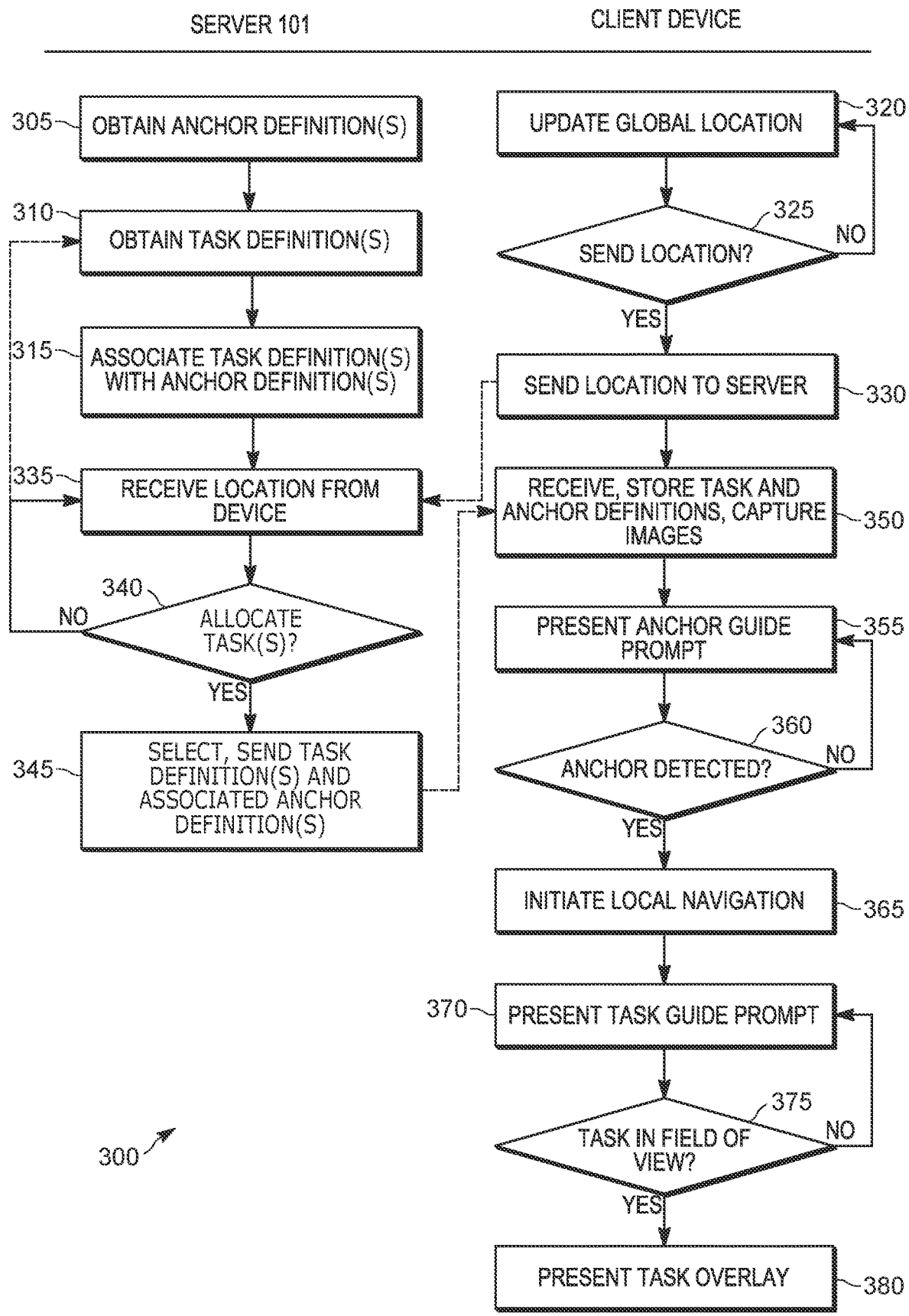
FIG. 3 is a flowchart of a method of generating and deploying navigational assistance information in the system of FIG. 1.

Turning to FIG. 3, a method 300 of generating and deploying navigational assistance information is shown. As illustrated in FIG. 3, certain blocks of the method 300 are performed by the server 101, while other blocks of the method 300 are performed by the client device 105. In other embodiments, the server 101 can be configured to perform certain blocks shown in FIG. 3 as being performed by the client device 105. In still other embodiments, the client device 105 can be configured to perform certain blocks shown in FIG. 3 as being performed by the server 101.

At block 305, the server 101 is configured to obtain one or more anchor definitions, for storage in the memory 122 (e.g. in the repository 132). Anchor definitions can be obtained at the server 101 during the initial deployment of the system 100 in the facility. In general, an anchor definition includes data defining a position within the facility. The position, in the present discussion, corresponds to a location according to the global frame of reference 102, as well as an orientation (e.g. yaw, pitch and roll angles at the above-mentioned location). Each anchor definition also includes a feature set corresponding to physical characteristics of the facility at the above-mentioned position. In other words, an anchor definition defines various characteristics of the facility when observed from the anchor position. As will be discussed below, the use of an anchor definition therefore permits other computing devices, including the client device 105, to detect at least a portion of the feature set contained in the anchor definition. The client device 105 can thereby determine a current position of the client device 105 both globally (i.e. according to the frame of reference 102) and locally, with respect to the anchor position.

Anchor definitions may be obtained in a variety of ways at block 305. In some examples, each anchor definition is generated by a mobile data capture device, such as a client device 105 or the apparatus 103. In particular, the mobile data capture device is placed (manually or via autonomous or semi-autonomous navigation) at a known position according to the frame of reference 102. The known position corresponds to the anchor position mentioned above. The mobile data capture device is then configured to capture data from the anchor position. The nature of the data captured is not particularly limited. In the present example, the data captured includes image data depicting physical structures within the facility surrounding the anchor position. That is, the mobile data capture device includes an image sensor configured to capture one or more image frames from the selected anchor position. The data captured for use in generating an anchor definition can also include depth scan data, for example acquired via lidar or depth camera. In further examples, the captured data can include proximity indicators such as wireless access point signatures (e.g. one or more received signal strength indicators (RSSI) and round trip times (RTT) for each of a plurality of access points detected from the anchor position), and/or beacon signatures (e.g. one or more identifiers of beacons detectable from the anchor position, such as Bluetooth low energy (BLE) beacon identifiers, visual light communication (VLC) emitter identifiers, and the like).

Following data capture as described above, a feature set is extracted from the captured data, for storage (along with the anchor position) as the anchor definition. A wide variety of features may be extracted to generate the feature set. In the case of captured image data, features can include any suitable combination of geometric constructs such as lines, planes and polygons, extracted via the execution of suitable edge and plane detection operations (e.g. random sample consensus (RANSAC), Sobel filters, and the like). Features extracted from image data can also include color and/or brightness histograms. Feature extraction may be performed at the capture device mentioned above, or at the server 101 upon receipt of the captured data from the capture device. Following data capture and feature extraction, the feature set is stored along with the global anchor position as an anchor definition in the memory 122 (e.g. in the repository 132).

Figure 4A:
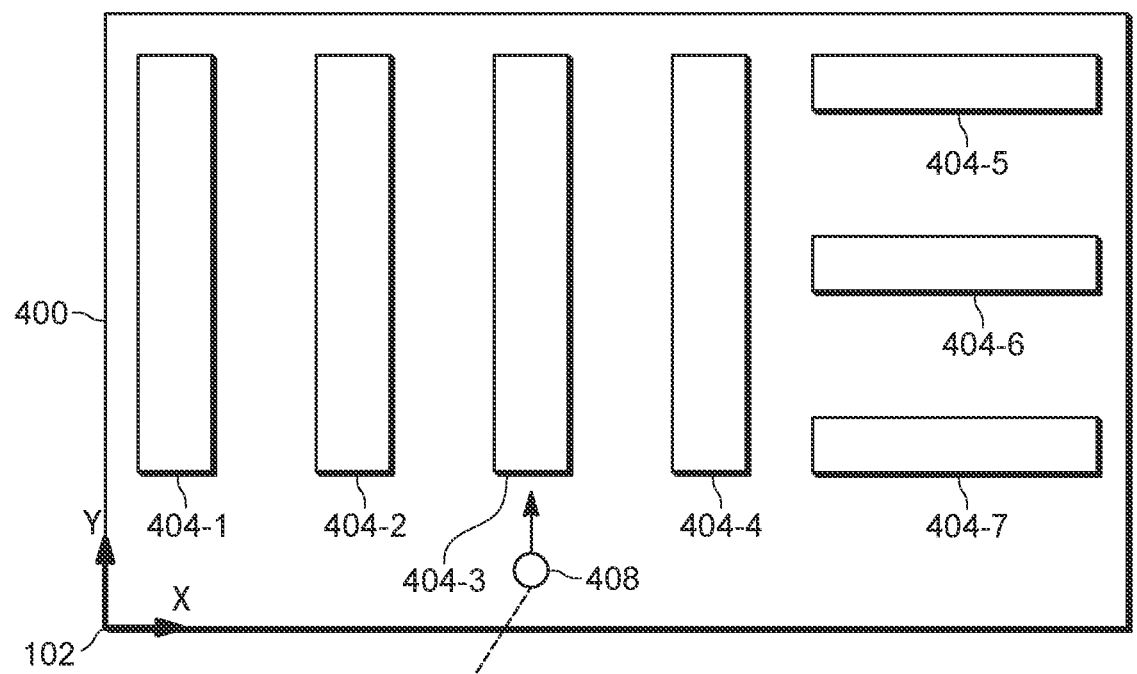
FIG. 4A is an overhead view of a facility illustrating an anchor position.
Figure 4B:
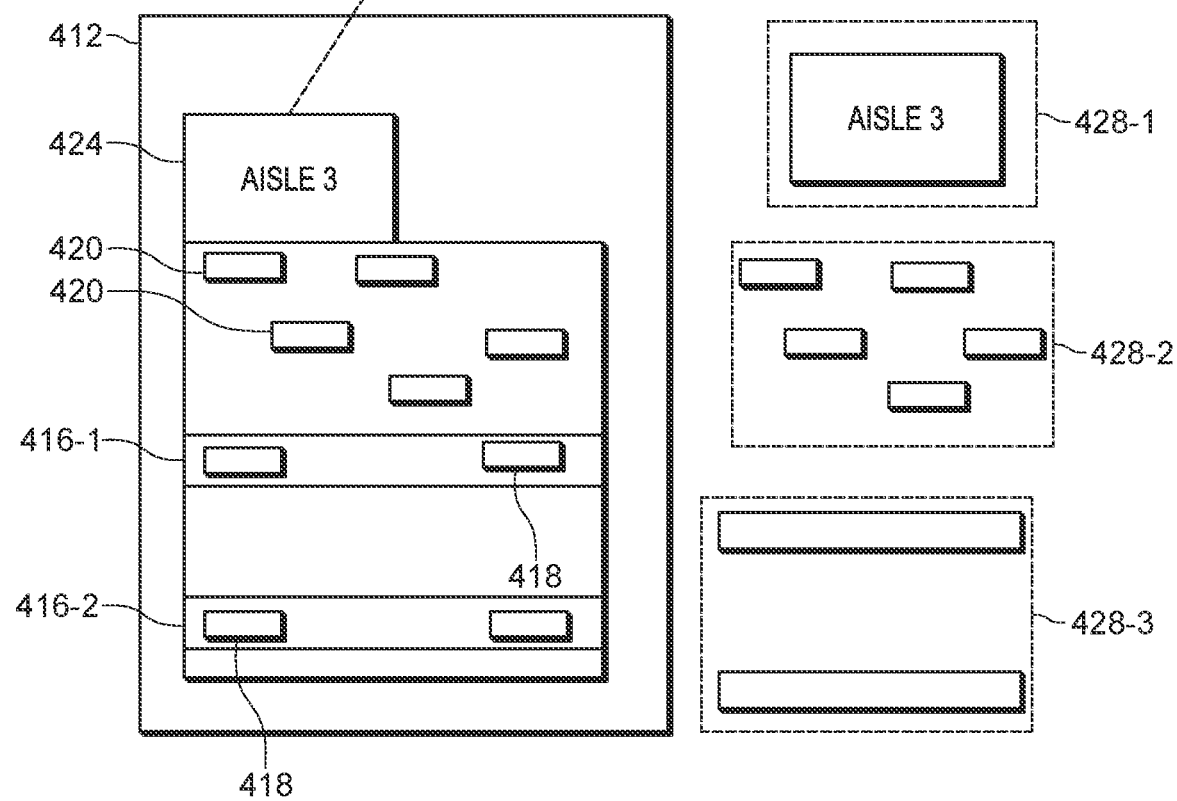
FIG. 4B depicts an anchor feature set employed in the method of FIG. 3.

FIGS. 4A and 4B illustrate the generation of an example anchor definition. In particular, FIG. 4A illustrates an overhead view of a facility 400 such as a retail facility containing a plurality of rows 404-1, 404-2, 404-3, 404-4, 404-5, 404-6 and 404-7 of shelf modules forming aisles. As seen in FIG. 4A, each row 404 occupies a region of the facility 400, which can be expressed as a set of coordinates in the global frame of reference 102. An anchor position 408 is also shown in FIG. 4A, defined by a location (e.g. the center of the circular element of the anchor position 408) and an orientation (e.g. the direction indicated by the arrow of the anchor position 408).

FIG. 4B illustrates image data 412 captured by a mobile data capture device (e.g. the apparatus 103 or the client device 105) during the creation of the anchor definition. In particular, the image data 412 includes an image frame captured from the anchor position 408, and depicting an aisle endcap. The endcap includes shelves 416-1 and 416-2 bearing labels 418, as well as a pegboard region bearing labels 420 (e.g. mounted on the end of pegs for supporting products). In addition, the endcap includes an aisle identifier, such as a sign 424 mounted atop the endcap.

The data capture device, or the server 101, are configured to extract features from the image data 412. In the present example, a feature set including three features 428-1, 428-2 and 428-3 is extracted from the image data 412 for storage as an anchor definition (along with the anchor position 408). As illustrated in FIG. 4A, the feature 428-1 includes the edges of the aisle identifier sign 424, as well as a text string defining the aisle identifier itself. The feature 428-1 defines the relative positions and dimensions of the edges and text string. The feature 428-2 includes edges, defined by their dimensions and relative positions, of the labels 420 supported on the pegboard mentioned above. The features 482-3, meanwhile, includes the edges of the shelves 416-1 and 416-2, defined by their dimensions and relative positions. The feature set may also store the relative positions of the features 428 relative to each other (e.g. a position of the center of the feature 428-1 relative to the center of the feature 428-3).

In a further example, an anchor definition can be generated by capturing one or more images as shown in FIG. 4B at the device 105. The device 105 can be further configured to detect a first plane definition corresponding to a floor of the facility, and a second plane definition (also referred to as a shelf plane) based on one or both of the labels 420 and the shelf edges 416. As will now be apparent, the floor plane and the shelf plane detected as discussed above are substantially orthogonal to each other. In addition, the device 105 can be configured to capture and decode an indicium such as a barcode from at least one of the labels 420. The location of the label 420 from which the barcode was captured, relative to the floor plane and the shelf plane, can be provided to the server, where a global location for the barcode is stored (e.g. in a planogram). Thus, a global anchor position is assigned to the anchor based on the predefined barcode location, and the anchor definition includes the definitions of the floor and shelf planes relative to the barcode location. A mobile device (e.g. the device 105, the apparatus 103 or the like) is therefore able to determine its current global location and orientation by detecting the planes and capturing the barcode.

A wide variety of other features may also be extracted from data captured along with the image data 412. As noted above, such features can include a list of access point RSSI and/or RTT values, a list of beacon identifiers, and the like.

The above process can be repeated for any desired number of anchor definitions. In facilities including rows of shelves, such as the rows 404 shown in FIG. 4A, the server 101 can be provided with at least one anchor definition per row 404. For example, two anchor definitions may be created for each row 404, each corresponding to one of the two endcaps of the row 404. In other examples, smaller or greater numbers of anchor definitions can be generated for provision to the server 101. In general, greater numbers of anchor definitions may improve the accuracy of the assistive navigational functions carried out by the server 101 and the client device 105 as described below, at the cost of increased data storage requirements and computational load. Conversely, smaller numbers of anchor definitions may reduce computational burden on the server 101 and/or the client device 105, while potentially reducing the accuracy of the assistive navigational functions.

Returning to FIG. 3, at block 310 the server 101 is configured to obtain one or more task definitions. Task definitions contain data defining tasks to be performed within the facility, for example to correct or otherwise update the above-mentioned status information determined by the server 101 with respect to products or other objects in the facility. The task definitions may therefore be obtained at block 310 by generating the task definitions at the server 101 itself. In other examples, one or more task definitions may be received at the server 101 at block 310, for example from the client device 105. For instance, an operator of the client device 105 may manipulate the client device 105 to transmit product status information to the server 101 (e.g. indicating that a product in a specified location is out of stock and requires a restocking task to be performed).

Each task definition includes a task position and task overlay data (which may also be referred to as task content). The task overlay data, as will be discussed in greater detail below, is subsequently presented at the client device 105 to assist an operator of the client device 105 in performing the corresponding task. The task overlay data may therefore include a product identifier, a task identifier (e.g. a text string indicating what action or sequence of actions is to be performed with respect to the product identifier), and the like. The task position defines a location within the facility at which the task indicated by the task overlay data is to be performed. In the present example, the server 101 is configured to generate task definitions with global task positions, defining the location of the task according to the global frame of reference 102. As will be seen below, however, the task definitions are subsequently updated to include local task positions, defining the position of the task relative to an anchor position (e.g. the anchor position 408).

Figure 5A:
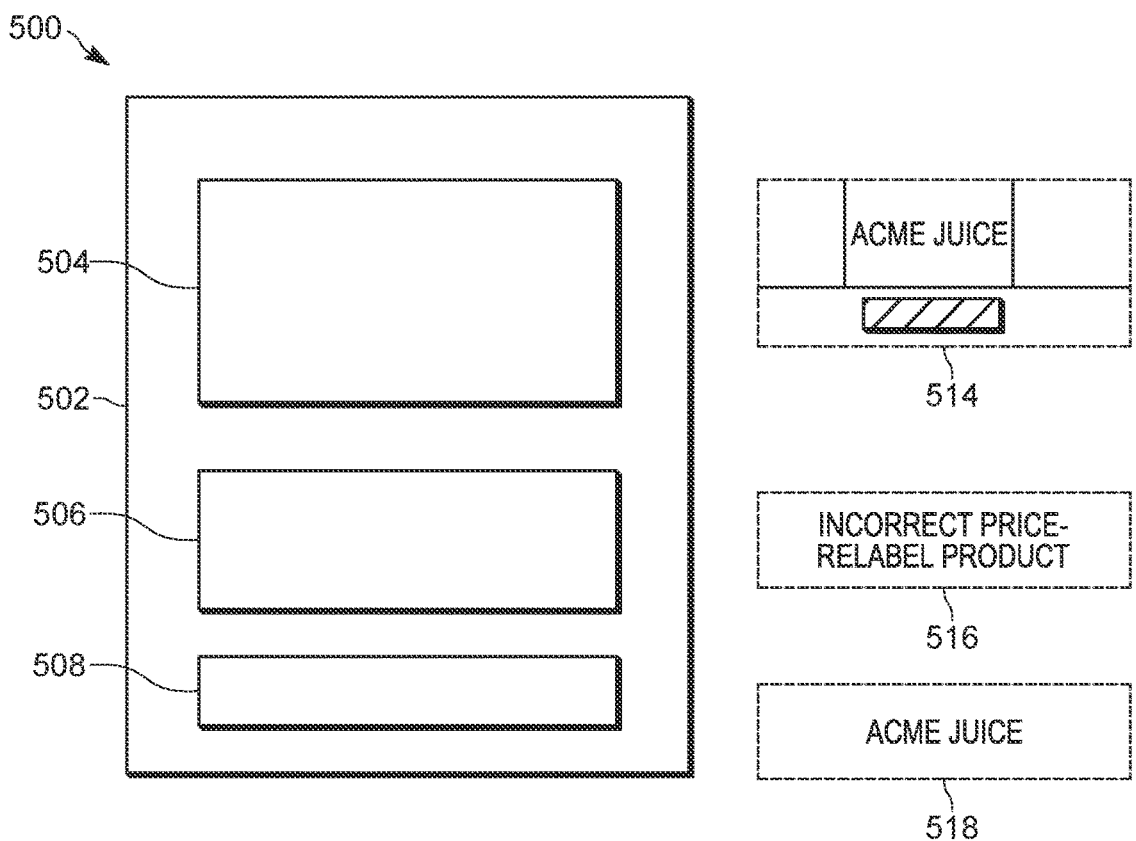
FIG. 5A depicts task overlay data employed in the method of FIG. 3.

Turning to FIG. 5A, example task overlay data 500 is shown for a task generated by the server 101 at block 310 responsive to detecting an incorrect price label in the facility 400 (e.g. from data captured by the mobile automation apparatus 103). The task overlay data 500 includes an overlay template 502 having fields 504, 506 and 508. The template 502 can be employed for each task definition generated by the server 101. In other examples, however, the task overlay data 500 need not be based on such a shared template.

The task overlay data 500 also includes content corresponding to the fields 504, 506 and 508. In particular, the task overlay data 500 includes an image 514 depicting a portion of a shelf at which the task is to be performed. The task overlay data 500 also includes a task descriptor, which in the illustrated example indicates that an incorrect price label has been detected (e.g. as highlighted in the image 514)

and must be replaced. Further, the task overlay data 500 includes a product identifier 518, such as a name, a stock-keeping unit (SKU) identifier, or the like. The image 514, task descriptor 516 and product identifier 518 are configured for rendering within the fields 504, 506 and 508 respectively at the client device 105, as will be discussed below. The task definition can include various other overlay data in other examples, including instructions (e.g. text, audio, video, or multimedia) for performing the task.

Figure 5B:
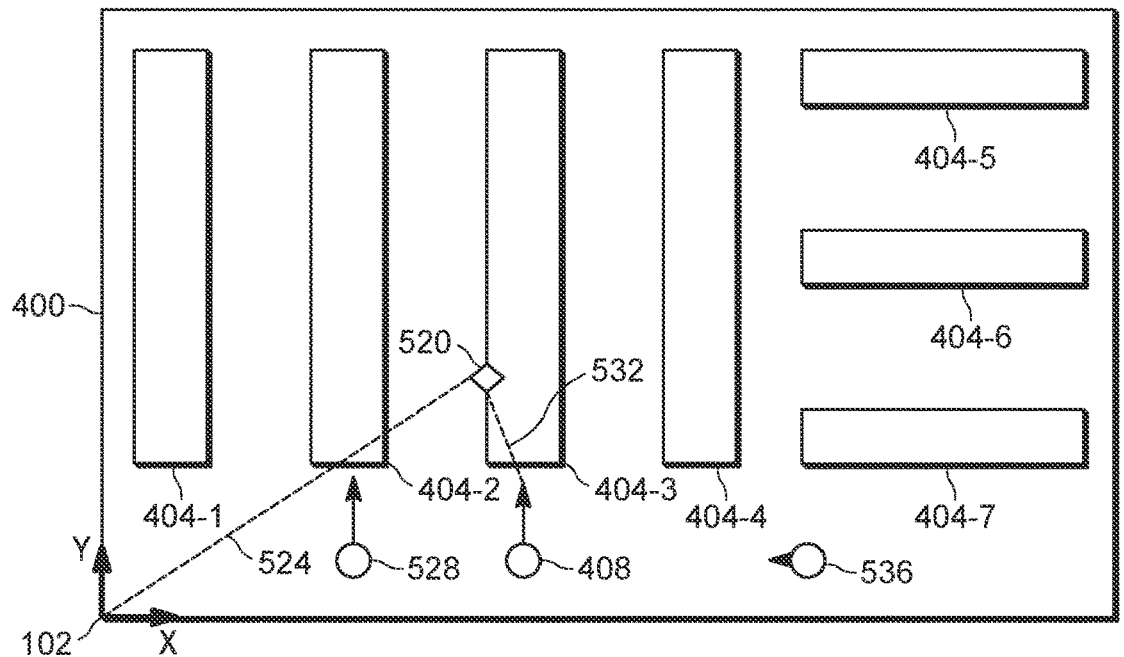
FIG. 5B depicts a further overhead view of the facility of FIG. 4A, illustrating anchor and device positions.

Turning to FIG. 5B, a task 520 defined by the overlay data 500 is shown within the facility 400. The server 101 is configured to generate a task position according to the frame of reference 102 at block 310, as indicated by the dashed line 524 (e.g. represented by a set of coordinates in the frame of reference 102). The server 101 is also configured, however, to store a local task position in the task definition, which indicates the position of the task relative to an anchor position rather than to the frame of reference 102.

Returning to FIG. 3, at block 315 the server 101 is configured to associate each task definition obtained at block 310 with at least one of the anchor definitions obtained at block 305. The server 101 is configured, based on the global position of the task definition (e.g. the position 524 of the task 520 shown in FIG. 5B), to select one of the anchor definitions. Having selected the anchor definition, the server 101 is configured to determine a local task position of the task relative to the anchor position, based on the global positions of the task and the selected anchor definition.

Referring again to FIG. 5B, a second anchor position 528 is shown, corresponding to an endcap of the row 404 adjacent to the endcap corresponding to the anchor position 408. At block 315, the server 101 is configured to select one of the anchor positions 408 and 528 (more specifically, one of the anchor definitions containing the anchor positions 408 and 528). For example, the server 101 can be configured to select the anchor definition having the anchor position closest to the global position of the task 520. In other examples, the server 101 can be configured to apply one or more additional criteria to the anchor selection at block 315. For example, when the facility 400 contains rows 404 of shelves, as does the illustrated example, the server 101 can be configured to select only from anchors associated with the row on which the task 520 is located. In the illustrated example, the server 101 selects the anchor definition containing the anchor position 408 for association with the task 520. The server 101 then determines the local task position 532, defining the position of the task 520 relative to the anchor position 408 rather than relative to the frame of reference 102. The task definition is updated with the local task position 532 (the global task position may be retained in the task definition, but can also be discarded) and an identifier of the corresponding anchor definition. In other examples, a task may be associated with more than one anchor definition. For example, if anchor definitions corresponding to both endcaps of the rows 404 are obtained at block 305, any task generated along a given row 404 may be associated with both corresponding anchor definitions. That is, the task definition may be updated with two local task positions and anchor definition identifiers.

Referring again to FIG. 3, at block 320 the client device 105 is configured to update a global location of the client device 105. The global location of the client device 105, in the frame of reference 102, can be updated according to any of a variety of suitable localization mechanisms. For example, the client device 105 can be configured to provide motion data from the motion sensor 164 as an input to a Kalman filter or other suitable localization algorithm. The client device 105 can also be configured, in some examples, to employ proximity data such as RSSI values and/or RTT values detected in association with wireless access points, beacons or the like, to update the global location at block 320. Updating the location of the device 105 can also be performed by detection of an anchor, if the device 105 has previously been provided with one or more anchor definitions.

At block 325, the client device 105 is configured to determine whether to report the global location from block 320 to the server 101. For example, the client device 105 may be configured to report its global location to the server 101 periodically (e.g. every ten seconds) and the determination at block 325 can be a determination as to whether the configured period has elapsed since the previous location report to the server 101. When the determination at block 325 is negative, the client device 105 continues updating the global location at block 320.

When the determination at block 325 is affirmative, the client device 105 sends its current global location (i.e. in the frame of reference 102) to the server 101 at block 330. The client device 105 typically continues to update the global location and periodically report the global location in parallel with the remainder of the method 300.

At block 335, the server 101 is configured to receive the global location of the client device 105. At block 340, the server 101 is configured to determine whether to allocate one or more tasks to the client device 105. In the present example the determination at block 340 is based on the global location of the client device 105. Specifically, the server 101 is configured to allocate a task to the client device 105 based on proximity between the current (i.e. most recently reported) location of the client device 105 and the global position of the task. In examples in which the global task position is not retained following the performance of block 315, the server 101 is configured to allocate tasks to client devices 105 based on proximity between client device 105 location and anchor position (both in the frame of reference 102).

In other examples, the determination at block 340 can be based on other factors in addition to the location of the client device 105, and in certain examples the determination at block 340 is independent of the location of the client device 105. For example, the server 101 can be configured to allocate tasks to client devices 105 based on whether or not each client device 105 has been allocated a task, regardless of the location of the client device 105.

Other examples of criteria assessed by the server 101 at block 340 includes capabilities of the client device 105 or an associated operator (e.g. identified via login credentials provided at the input device 156). For example, the server 101 can maintain a list of client devices 105 and associated input and output capabilities, such as an indication of whether a client device 105 includes a label printer suitable for completing a price label correction task. Thus, the task descriptor and the client device capabilities, in addition to or instead of client device location, can be assessed by the server 101 at block 340.

When the determination at block 340 is negative, the server 101 is configured to await further location reports from the client device 105, and may also obtain additional task definitions (e.g. in response to further data collection activities by the mobile automation apparatus 103). When the determination at block 340 is affirmative, however, at block 345 the server 101 is configured to select at least one of the task definitions obtained at block 310 according to any of the criteria noted above, and to send both the task definition and the associated anchor definition (i.e. the anchor definition associated with the task definition at block 315) to the client device 105. Thus, at block 345 the server 101 is configured to transmit at least one task definition, containing the task overlay data and local task position, as well as the anchor definition according to which the local task position is defined, to the client device 105.

At block 350, the client device 105 is configured to receive and store the task and anchor definitions in the memory 152. The client device 105 is also configured to initiate an assistive navigational process at block 350. In the present example, the client device 105 is configured to capture a sequence of images using the camera 158 responsive to receiving the task and anchor definitions. The sequence of images are employed by the client device 105 to detect the feature set corresponding to the anchor definition received at block 350.

Figure 6:
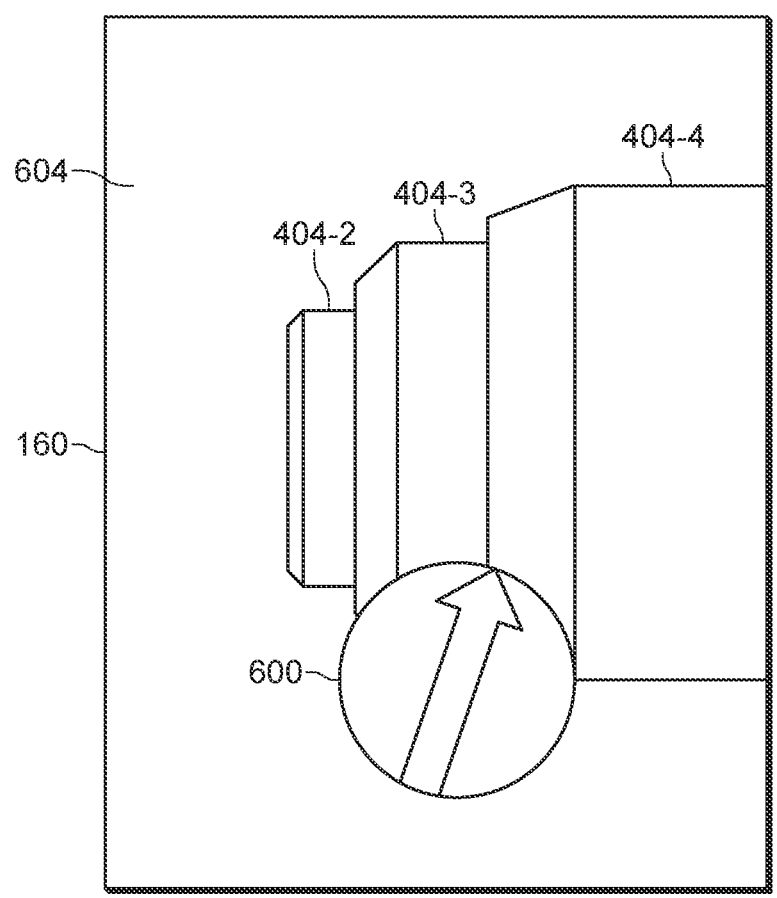
FIG. 6 depicts an anchor guide prompt generated at block 355 of the method of FIG. 3.

At block 355, the client device 105 is configured to present an anchor guide prompt, e.g. on the display 160 (although guide prompts can also be presented via other output devices, such as audible prompts via a speaker). The guide prompt presented at block 355 indicates the direction and optionally the distance from the current global position of the client device 105 to the global position of the anchor definition received at block 350. Referring briefly to FIG. 5B, a current position 536-1 of the client device 105 is illustrated. Turning to FIG. 6, an anchor guide prompt 600 is shown as presented on the display 160 of the client device 105. In particular the client device 105 presents not only the anchor guide prompt 600, but also the sequence of images whose capture was initiated at block 350. Thus, the display 160 also presents an image 604 from the sequence of images, depicting the current field of view of the camera 158. As will now be apparent, the anchor guide prompt 600 indicates the direction of travel required to arrive at the anchor position 408 (which is adjacent to the endcap of the row 404).

At block 360, the client device 105 is configured to determine whether the feature set of the anchor definition received at block 350 has been detected in one or more of the sequence of images captured using the camera 158. That is, the client device 105 is configured, for each of the sequence of images, to identify candidate features such as planes, lines, points and the like, and to determine whether the candidate features identified match any of the features in the feature set of the anchor definition received at block 350.

Figure 7A:
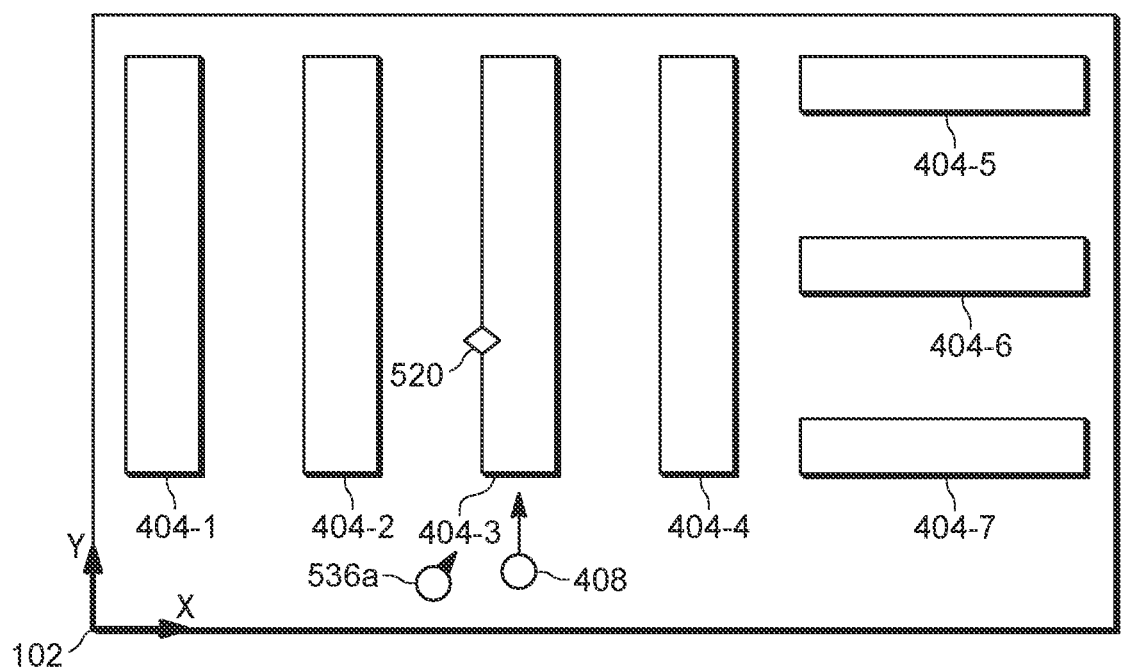
FIG. 7A depicts an overhead view of the facility of FIG. 4 during the performance of the method of FIG. 3.
Figure 7B:
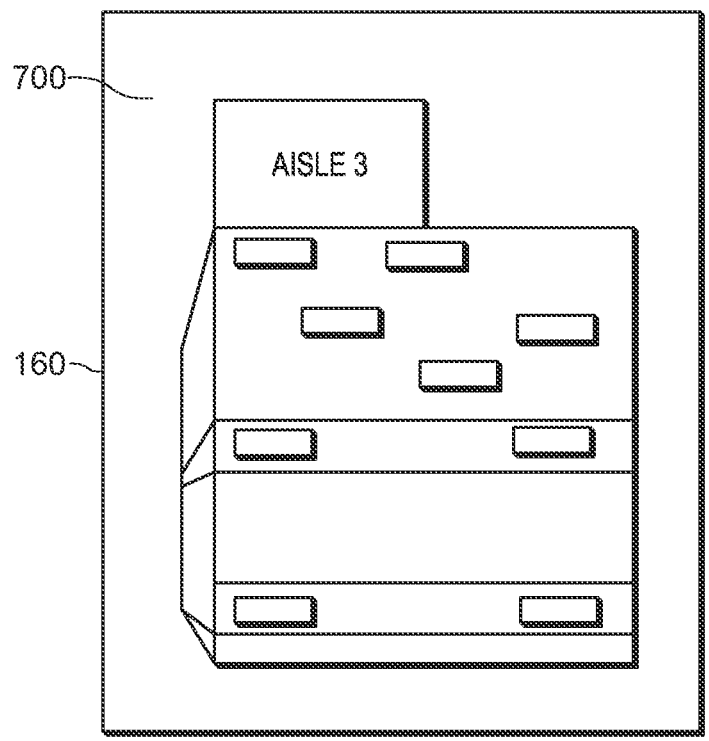
FIG. 7B depicts image data captured by the client device.

In the present example performance of the method 300, it is assumed that the features 428-1, 428-2 and 428-3 as shown in FIG. 4B are not detected in the image 604 presented in FIG. 6. The client device 105 therefore returns to block 355, and continues presenting the anchor guide prompt 600, updating the orientation of the anchor guide prompt according to the global position of the client device 105 relative to the global anchor position 408. Turning to FIG. 7A, an updated position 536a of the client device 105 is shown adjacent to the endcap of the row 404-3. FIG. 7B illustrates an image 700 in the sequence of images whose capture was initiated at block 350. As will be apparent from FIG. 7B, the features 428 of the anchor definition are detectable in the image 700. The determination at block 360 is therefore affirmative. Further, distortions between the features 428 as represented in the image 700 and the features 428 as defined in the anchor definition shown in FIG. 4B enable the client device 105 to determine the position of the client device 105 relative to the anchor position 408.

In other words, detection of the anchor at block 360 causes the client device 105 to initiate a local navigation mode at block 365, in which the client device 105 is configured to determine and update a local device position relative to the anchor position 408. The device may continue to update the global location mentioned above in connection with block 320, but the remaining blocks of the method 300 are performed by the client device based on the local device position, which may be subject to reduced errors (e.g. errors incurred due to drift in the motion sensor 164) in comparison to the global location of the client device 105. The local navigational mode includes the use of not only the motion sensor 164 and communications interface 162 (for detecting wireless access point signatures), but also of the camera 158 and in particular the sequence of images whose capture was initiated at block 350. Specifically, the client device 105 can be configured to detect transient features in a subset of the images (e.g. planes, lines, points and the like) and to track changes in positions of such transient features within the images so long as the transient features remain visible. The client device 105 is then configured, based on detected changes in position of the transient features between images in the sequence, to update the local device position.

Figure 8A:
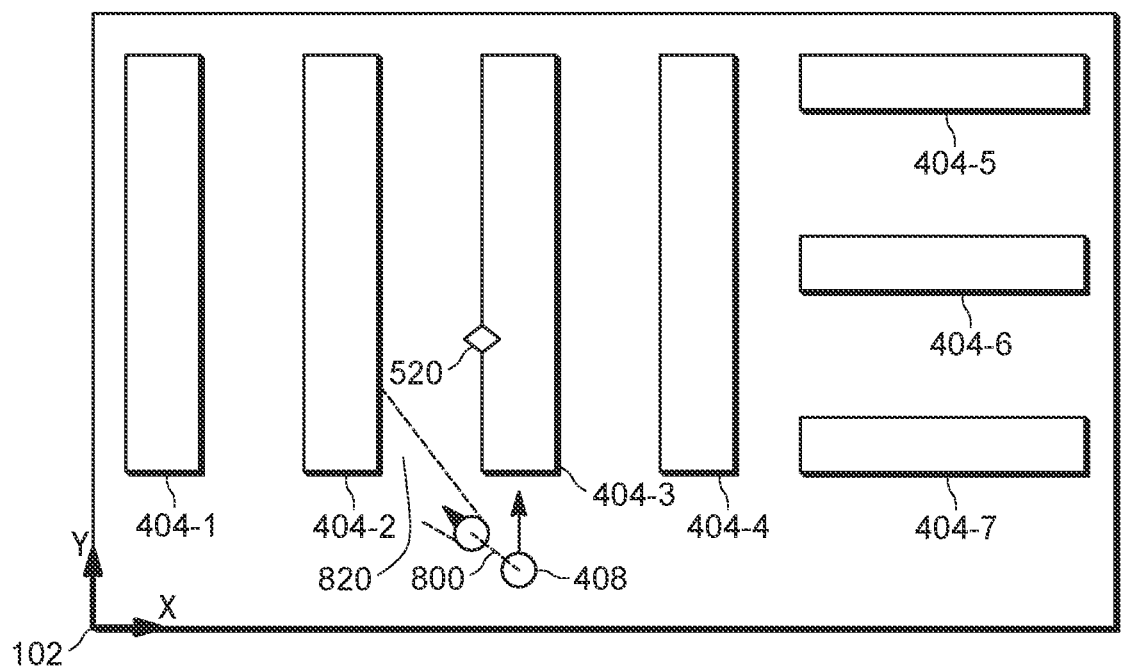
FIG. 8A depicts a further overhead view of the facility of FIG. 4 during the performance of the method of FIG. 3.
Figure 8B:
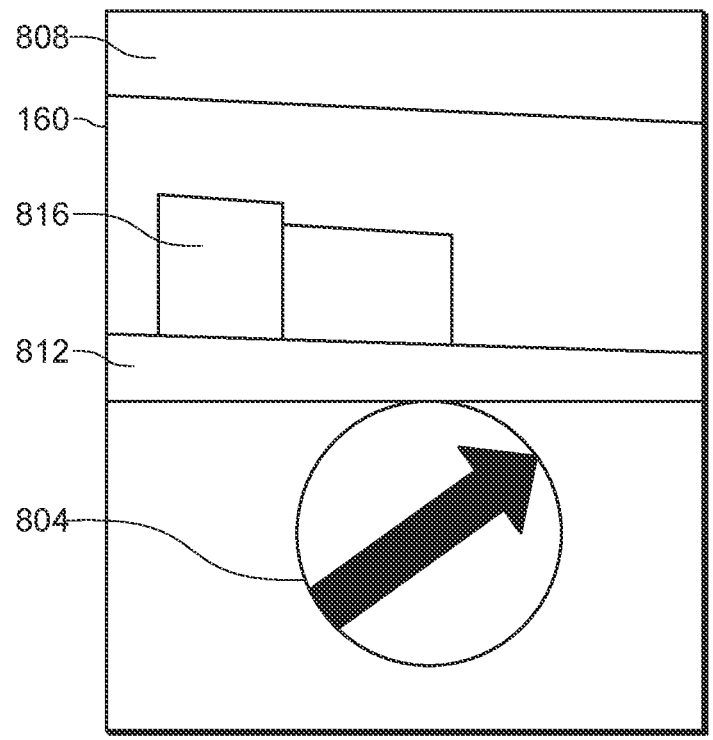
FIG. 8B depicts image data captured by the client device.

FIG. 8A illustrates a further overhead view of the facility 400, following travel of the client device 105 to a further position 536b. The client device 105 is configured to maintain an updated local device position 800 relative to the anchor position 408 (e.g. employing the anchor position 408 as the origin of a local frame of reference). At block 370 the client device 105 is configured to present a task guide prompt, indicating a direction of travel and optionally a distance to the task position, determined according to the task position specified in the task definition and the local device position 800. FIG. 8B illustrates a task guide prompt 804 presented on the display 160 along with an image 808 of the above-mentioned sequence. Also shown in FIG. 8B are examples of the transient features noted above, employed for local navigation. In particular, a shelf edge 812 and a product 816 may be identified by the client device 105 in the image 808 as well as a subsequent image. Based on changes in the positions of the shelf edge 812 and the product 816 between images, the client device 105 can determine an updated local position.

Referring again to FIG. 3, at block 375 the client device 105 is configured to determine whether the task position is within a field of view of the client device 105. The determination at block 375 is made based on the task position (which is a local position, defined relative to the anchor position 408) and the local device position, as well as on a field of view definition stored in the memory 152. An example field of view 820 is shown in FIG. 8A, and may correspond to the field of view of the camera 158. As is evident from FIG. 8A, the task position 520 is not within the field of view 820, and the determination at block 375 is therefore negative. Following a negative determination at block 375, the client device 105 is configured to return to block 370 to update the task guide prompt based on the current local device position. Block 375 is then repeated.

Figure 9A:
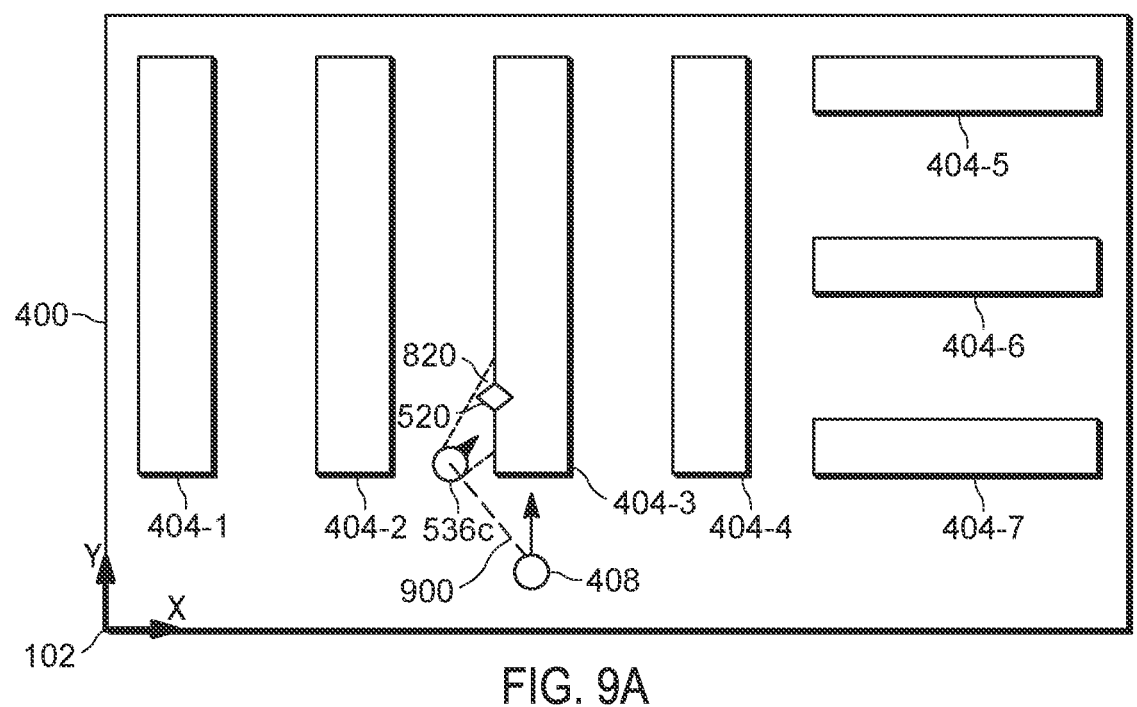
FIG. 9A depicts a further overhead view of the facility of FIG. 4 during the performance of the method of FIG. 3.

When the determination at block 375 is affirmative, the performance of the method 300 proceeds to block 380. Turning to FIG. 9A, a further overhead view of the facility 400 is shown, in which the client device 105 has advanced further into the aisle containing the task 520, to a position 536c, tracked at the client device 105 as a local device position 900. The client device 105 has also been reoriented towards the row 404-3 of shelves, and the determination at block 375 is affirmative (the task position 520 falls within the field of view 820). At block 380, therefore, the client device 105 is configured to present the task overlay data on the display 160 along with the above-mentioned sequence of images. In other words, the task overlay data is presented on the display as an augmented reality overlay (i.e. a virtual object) on the stream of images captured by the camera 158.

Figure 9B:
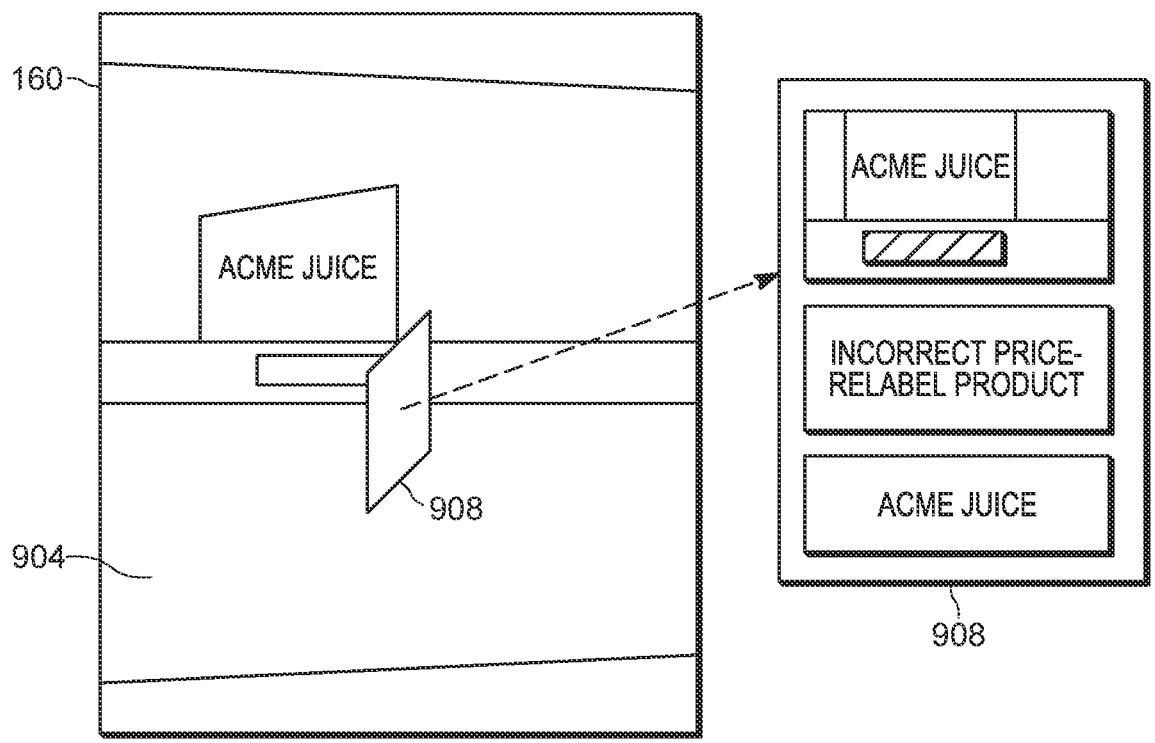
FIG. 9B depicts the presentation of task overlay information responsive to arrival of the client device at the position shown in FIG. 9A.

FIG. 9B illustrates a performance of block 380, with the client device 105 at the position 536c shown in FIG. 8A. In particular, an image 904 from the sequence initiated at block 350 is presented on the display 160, along with a virtual object overlay 908 containing the task overlay data 500 discussed earlier in connection with FIG. 5A. The performance of the method 300 thus enables the client device 105 to aid an operator of the client device 105 in locating a task position within the facility, and in performing the corresponding task.

Variations to the above systems and methods are contemplated. For example, in some embodiments the local device position mentioned above in connection with block 365 can be presented, e.g. on the display 160 of the client device 105, even in the absence of a task definition. For example, the device 160 can be configured, following detection of an anchor such as the aisle endcap shown in FIG. 7B, to present a map of the facility, or a portion thereof (e.g. a map of the corresponding aisle). Overlaid on the map, the device 105 can be configured to present an indication of the location of the device 105, as determined at block 365.

As mentioned previously, task definitions obtained by the server 101 at block 310 can be received from the client device 105. In particular, in some embodiments the client device 105 is configured to update a global location as at block 320, and to receive anchor definitions as discussed above in connection with block 350. However, the client device 105 need not receive task definitions. Instead, having detected an anchor at block 360, such as an endcap of an aisle (e.g. as shown in FIG. 7B), the client device 105 is configured to initiate local navigation and to capture one or more barcodes or other indicia.

The indicia captured by the client device 105 correspond to labels on the shelves 110 at which one or more tasks are required (e.g. to restock a product, correct a price on the label, or the like). The client device 105 is configured to determine a location of each scanned indicium based on the local navigation and the global location of the client device 105 itself, as well as on the location of the indicium relative to the client device 105. For example, the relative location of the indicium can be determined from an image of the indicium based on calibration parameters of the camera 158 along with dimensions of the indicium within the image.

Having located the scanned indicium in the facility (i.e. relative to the frame of reference 102), the client device 105 can be configured to receive input data defining task overlay data, such as an indication of the type of task to be performed (e.g. restock). The location of the indicium corresponds to the above-mentioned task position, and is transmitted along with the task overlay data to the server 101 for storage as a task definition.

In further embodiments, as noted earlier, the server 101 can be configured to perform certain blocks shown in FIG. 3 as being performed by the client device 105, and/or the client device 105 can be configured to perform certain blocks shown in FIG. 3 as being performed by the server 101. For example, in another embodiment the server 101 can be configured to determine a location of the client device 105 at block 320. Blocks 325, 330 and 335 can therefore be omitted. The server 101 can also be configured to receive image data captured by the client device 105 and detect anchors therein. In other words, rather than sending task and anchor definitions to the client device 105 at block 345, the server 101 is configured to select the task and anchor definitions, and the client device 105 is configured to capture and send images to the server 101 at block 350. The server 101, in turn, is configured to generate and send an anchor guide prompt to the client device 105 for presentation at block 355, and to perform the determination at block 360. The server 101 can be further configured to perform the processing associated with local navigation at block 365, and to generate and send the task guide prompt to the client device 105 for presentation at block 370. Still further, the server 101 can be configured to perform the determination at block 375 (based on captured images received from the client device 105) and to generate and send the task overlay for presentation by the client device 105 at block 380.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of navigational assistance at a mobile computing device for deployment in a facility having a global frame of reference, the method comprising:
   in a global navigation mode, determining a global device position in the global frame of reference;
   receiving an anchor definition containing (i) an anchor position in the global frame of reference, and (ii) a feature set corresponding to physical characteristics of the facility at the anchor position;
   receiving a task definition containing (i) a task position defined relative to the anchor position, and (ii) task overlay data;
   capturing, using an image capture module, a sequence of images;
   responsive to detecting the feature set of the anchor definition in the sequence of images, switching from the global navigation mode to a local navigation mode by determining a local device position of the mobile computing device relative to the anchor position;
   based on the local device position and the task position, determining whether the task position is within a field of view of the mobile computing device;
   responsive to determining that the task position is within the field of view, presenting the sequence of images overlaid with the task overlay data on a display.

2. The method of claim 1, further comprising:
   prior to receiving the anchor definition and the task definition, determining the global device position of the mobile computing device and sending the global device position to a server; and
   receiving the anchor definition and the task definition responsive to sending the global device position.

3. The method of claim 1, wherein determining the local device position comprises:
   identifying transient features in the sequence of images and tracking the local device position based on movement of the transient features between images in the sequence.

4. The method of claim 1, wherein the feature set corresponds to (i) a visual appearance of physical structures in the facility and (ii) a proximity indicator corresponding to the proximity of the anchor position to a wireless transmitter; and
   wherein the method further comprises:
      capturing simultaneously with the sequence of images, using at least one of the image capture module and a communications interface, proximity signatures;
      wherein detecting the feature set includes (i) detecting the visual appearance in the sequence of images, and (ii) detecting the proximity indicator in the proximity signatures.

5. The method of claim 4, wherein the proximity indicator includes at least one of:
   a received signal strength indicator (RSSI) corresponding to a wireless access point;
   a round trip time (RTT) corresponding to the wireless access point;
   an identifier of a wireless beacon; and
   an identifier of a visual light communication (VLC) emitter.

6. The method of claim 1, wherein presenting the sequence of images and the overlay data includes selecting a portion of the image corresponding to the task location, and presenting the overlay data on the selected portion.

7. The method of claim 1, further comprising:
   responsive to determining that the task position is not within the field of view, presenting a task guide prompt on the display indicating the task position relative to the local device position.

8. The method of claim 1, wherein the overlay data includes at least one of a task descriptor and an object identifier.

9. A mobile computing device for navigational assistance in a facility having a global frame of reference, the mobile computing device comprising:
   a memory storing:
      an anchor definition containing (i) an anchor position in the global frame of reference, and (ii) a feature set corresponding to physical characteristics of the facility at the anchor position; and
      a task definition containing (i) a task position defined relative to the anchor position, and (ii) task overlay data;
   a display;
   an image capture module configured to capture a sequence of images;
   a processor connected to the memory, the display and the image capture module, the processor configured to:

in a global navigation mode, determine a global device position in the global frame of reference;

responsive to detecting the feature set of the anchor definition in the sequence of images, switch from the global navigation mode to a local navigation mode by determining a local device position of the mobile computing device relative to the anchor position;

based on the local device position and the task position, determine whether the task position is within a field of view of the mobile computing device; and responsive to determining that the task position is within the field of view, control the display to present the sequence of images overlaid with the task overlay data on a display.

10. The mobile computing device of claim 9, further comprising:

a communications interface; and a motion sensor configured to generate motion data;

wherein the processor is further configured, prior to receiving the anchor definition and the task definition for storage in the memory, to determine the global device position of the mobile computing device based on the motion data, the processor further configured to send the global device position to a server via the communications interface.

11. The mobile computing device of claim 9, wherein the processor is further configured to determine the local device position by identifying transient features in the sequence of images and track the local device position based on movement of the transient features between images in the sequence.

12. The mobile computing device of claim 9, further comprising a communications interface; wherein the feature set corresponds to (i) a visual appearance of physical structures in the facility and (ii) a proximity indicator corresponding to the proximity of the anchor position to a wireless transmitter;

wherein the processor is further configured to control at least one of the image capture module and the communication interface to capture, simultaneously with the sequence of images, proximity signatures; and wherein the processor is further configured, to detect the feature set, to (i) detect the visual appearance in the sequence of images, and (ii) detect the proximity indicator in the proximity signatures.

13. The mobile computing device of claim 12, wherein the proximity indicator includes at least one of:

a received signal strength indicator (RSSI) corresponding to a wireless access point;

a round trip time (RTT) corresponding to the wireless access point;

an identifier of a wireless beacon; and an identifier of a visual light communication (VLC) emitter.

14. The mobile computing device of claim 9, wherein the processor is further configured to present the sequence of images and the overlay data by selecting a portion of the image corresponding to the task location; the processor further configured to present the overlay data on the selected portion.

15. The mobile computing device of claim 9, wherein the processor is further configured, responsive to determining that the task position is not within the field of view, to present a task guide prompt on the display indicating the task position relative to the local device position.

16. The mobile computing device of claim 9, wherein the overlay data includes at least one of a task descriptor and an object identifier.

* * * * *